US009791742B2

(12) United States Patent
Cho et al.

(10) Patent No.: US 9,791,742 B2
(45) Date of Patent: Oct. 17, 2017

(54) LIQUID CRYSTAL DISPLAY DEVICE

(71) Applicant: Samsung Display Co., LTD., Yongin, Gyeonggi-Do (KR)

(72) Inventors: Seon-Ah Cho, Busan (KR); Sang-Jae Kim, Seongnam-si (KR); Hyoung-Joo Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 169 days.

(21) Appl. No.: 14/455,003

(22) Filed: Aug. 8, 2014

(65) Prior Publication Data

US 2015/0227004 A1 Aug. 13, 2015

(30) Foreign Application Priority Data

Feb. 13, 2014 (KR) ........................ 10-2014-0016308

(51) Int. Cl.
  *G02F 1/1337* (2006.01)
  *G02F 1/1335* (2006.01)
  *G02F 1/1343* (2006.01)

(52) U.S. Cl.
  CPC .. *G02F 1/133707* (2013.01); *G02F 1/133504* (2013.01); *G02F 2001/134318* (2013.01)

(58) Field of Classification Search
  CPC ... G02F 1/133504; G02F 2001/134318; G02F 1/133707; G02B 5/0215; G02B 5/0257
  See application file for complete search history.

(56) References Cited

U.S. PATENT DOCUMENTS

| 7,791,257 | B2 | 9/2010 | Hirata et al. | |
|---|---|---|---|---|
| 8,249,409 | B2 | 8/2012 | Zhang et al. | |
| 2002/0118329 | A1* | 8/2002 | Koma | G02F 1/133707 349/130 |
| 2003/0112394 | A1* | 6/2003 | Yoshida | G02F 1/133753 349/123 |
| 2008/0049181 | A1* | 2/2008 | Cho | G02F 1/136213 349/144 |
| 2010/0245736 | A1* | 9/2010 | Nishihara | G02B 5/0236 349/112 |
| 2011/0181810 | A1* | 7/2011 | Miyamoto | G02F 1/133606 349/64 |

(Continued)

FOREIGN PATENT DOCUMENTS

| JP | 2011-027764 A | 2/2011 |
|---|---|---|
| JP | 2012-255819 A | 12/2012 |

(Continued)

*Primary Examiner* — Jessica M Merlin
(74) *Attorney, Agent, or Firm* — Cantor Colburn LLP

(57) ABSTRACT

A liquid crystal display device includes a liquid crystal display panel which includes an array substrate including a pixel electrode, a gate line extending in a first direction and crossing the pixel electrode, and a data line extending in a second direction substantially perpendicular to the first direction, an opposing substrate including a common electrode in which a slit extending in the first direction and overlapping the gate line is defined, and a liquid crystal layer between the array substrate and the opposing substrate, and a light diffusion film which is disposed on the liquid crystal display panel and includes a plurality of low-refractive line members which respectively extends in the first direction and arranged in the second direction.

20 Claims, 9 Drawing Sheets

(56) References Cited

U.S. PATENT DOCUMENTS

| | | | | |
|---|---|---|---|---|
| 2012/0008062 A1* | 1/2012 | Jeong | ................ | G02F 1/133615 349/58 |
| 2012/0147285 A1* | 6/2012 | Seong | ............... | G02F 1/133707 349/43 |
| 2012/0268826 A1* | 10/2012 | Umeda | ................ | G02B 5/0231 359/599 |
| 2014/0198287 A1* | 7/2014 | Tamaki | ............. | G02F 1/133504 349/112 |

FOREIGN PATENT DOCUMENTS

| | | |
|---|---|---|
| KR | 1020080071274 A | 8/2008 |
| KR | 1020100000779 A | 1/2010 |
| KR | 1020100038073 A | 4/2010 |

* cited by examiner

LIQUID CRYSTAL DISPLAY DEVICE

This application claims priority to Korean Patent Application No. 10-2014-0016308, filed on Feb. 13, 2014, and all the benefits accruing therefrom under 35 U.S.C. §119, the contents of which in its entirety is herein incorporated by reference.

BACKGROUND

1. Field

Exemplary embodiments of the invention relate to a liquid crystal display ("LCD") device. More particularly, exemplary embodiments of the invention relate to an LCD device capable of improving display quality.

2. Description of the Related Art

A liquid crystal display ("LCD") device may include a backlight unit to generate light and an LCD panel to control the light. The LCD panel may include an array substrate, an opposing substrate facing the array substrate and an LCD panel therebetween. The array substrate may include a plurality of pixel electrodes arranged in a matrix shape. An image driving part may apply a voltage to one of the pixel electrodes. An electrical field by the voltage may adjust alignment of liquid crystals in the liquid crystal layer.

The LCD panel may adjust the alignment of the liquid crystals to control the light from the backlight unit. When the pixel electrodes are divided into a plurality of domains, the liquid crystals may be aligned in different directions from each other in the domains. Thus, a viewing angle of the LCD panel may be improved.

In an exemplary embodiment, an LCD panel may have a patterned vertical alignment ("PVA") structure, for example, in which pixel electrodes are divided into two domains to improve a viewing angle.

SUMMARY

One or more exemplary embodiment of the invention provides a liquid crystal display ("LCD") device capable of improving a viewing angle in all directions including a longitudinal direction and a transverse direction.

In an exemplary embodiment of an LCD device according to the invention, the LCD device includes an LCD panel and a light diffusion film on the LCD panel. The light diffusion film includes a plurality of low-refractive line members respectively extending in a first direction. The plurality of low-refractive line members are arranged in a second direction substantially perpendicular to the first direction. The LCD panel includes an array substrate, an opposing substrate and a liquid crystal layer between the array substrate and the opposing substrate. The array substrate includes a pixel electrode, a gate line extending in the first direction and crossing the pixel electrode, and a data line extending in the second direction. The opposing substrate includes a common electrode in which a slit extending in the first direction is defined. The slit overlaps the gate line.

In an exemplary embodiment, the light diffusion film may further include a body member having a refractive index greater than that of the plurality of low-refractive line members.

In an exemplary embodiment, a cross-section of one of the plurality of low-refractive line members cut along the second direction may have a substantially V-shape.

In an exemplary embodiment, a width of one of the plurality of low-refractive line members may be substantially equal to a gap between adjacent low-refractive line members of the plurality of low-refractive line members.

In an exemplary embodiment, a pitch of the plurality of low-refractive line members may be equal to or greater than about 50 micrometers (μm) and equal to or less than about 80 μm.

In an exemplary embodiment, a thickness of the light diffusion film may be equal to or less than about 400 μm.

In an exemplary embodiment, the gate line may cross a central portion of the pixel electrode.

In an exemplary embodiment, a first width of the pixel electrode along the first direction may be greater than a second width of the pixel electrode along the second direction.

In an exemplary embodiment, the opposing substrate may further include a color filter pattern overlapping the pixel electrode.

In an exemplary embodiment, the opposing substrate may further include a light blocking pattern overlapping a boundary portion of the pixel electrode.

In an exemplary embodiment, the LCD device may further include a first polarizer disposed under the array substrate and a second polarizer between the opposing substrate and the light diffusion film.

In an exemplary embodiment, a pixel area corresponding to the pixel electrode may be divided into a first domain and a second domain by the gate line. Liquid crystals in the liquid crystal layer may be configured to align along a same direction in the first domain and the second domain in a plan view.

In an exemplary embodiment, the liquid crystals in the liquid crystal layer may be configured to incline with respect to a thickness direction of the liquid crystal layer in the first domain and the second domain.

In an exemplary embodiment, the array substrate may further include a switching element electrically connected to the gate line, the data line and the pixel electrode.

In an exemplary embodiment of an LCD device according to the invention, the LCD device includes a backlight unit configured to generate light, an LCD panel configured to control the light and a light diffusion film on the LCD panel. The light diffusion film includes a plurality of plurality of low-refractive line members respectively extending in a first direction. The plurality of low-refractive line members are arranged in a second direction substantially perpendicular to the first direction. The LCD panel includes an array substrate, an opposing substrate and a liquid crystal layer between the array substrate and the opposing substrate. The array substrate includes a pixel electrode, a gate line extending in a first direction and crossing the pixel electrode, and a data line extending in a second direction. The opposing substrate includes a common electrode in which a slit extending in the first direction is defined. The slit overlaps the gate line.

In an exemplary embodiment, the light diffusion film may further include a body member having a refractive index greater than the plurality of low-refractive line members.

In an exemplary embodiment, a cross-section of one of the plurality of low-refractive line members cut along the second direction may have a substantially V-shape.

In an exemplary embodiment, the gate line may cross a central portion of the pixel electrode.

In an exemplary embodiment, a first width of the pixel electrode along the first direction may be greater than a second width of the pixel electrode along the second direction.

In an exemplary embodiment, a third width of the LCD panel along the first direction may be greater than a fourth width of the LCD panel along the second direction.

According to one or more exemplary embodiment of the LCD device, an LCD panel may have a patterned vertical alignment structure in which a pixel area is divided into two domains and a light diffusion film on the LCD panel may include a plurality of low-refractive line members substantially perpendicular to an alignment direction of liquid crystals in the LCD panel in a plan view, thereby improving a viewing angle of an image in all directions including a longitudinal direction and a transverse direction.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
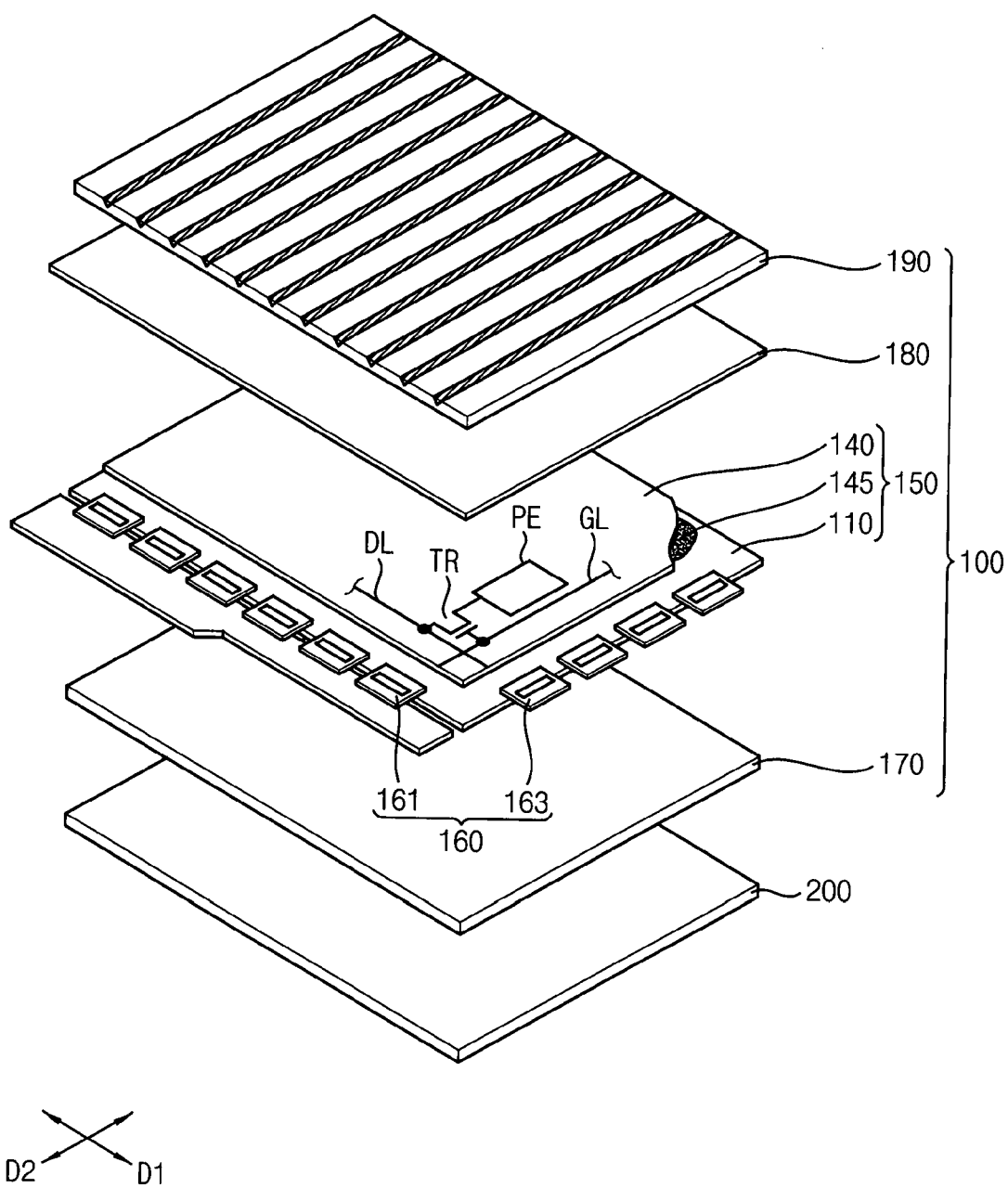
FIG. 1 is an exploded perspective view illustrating an LCD device according to an exemplary embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

FIG. 1 is an exploded perspective view illustrating a liquid crystal display device according to the invention.

Referring to FIG. 1, an LCD device according to the exemplary embodiment may include a display panel assembly 100 and a backlight unit 200.

The backlight unit 200 may be configured to generate light. The backlight unit 200 may be configured to provide the display panel assembly 100 with the light. In exemplary embodiments, the backlight unit 200 may be, e.g., a direct-illumination type, an edge-illumination type, etc. When the backlight unit 200 is the direct-illumination type, the backlight unit 200 may include a light source disposed under a display area of the display panel assembly 100. When the backlight unit 200 is the edge-illumination type, the backlight unit 200 may include a light guide plate disposed under the display area and a light source disposed adjacent to an edge of the light guide plate.

The display panel assembly 100 may include an LCD panel 150, a light diffusion film 190 and an image driving part 160 configured to drive the LCD panel 150. The display panel assembly 100 may further include a first polarizer 170 under the LCD panel 150 and a second polarizer 180 on the LCD panel 150. The light diffusion film 190 may be disposed on the second polarizer 180.

The LCD panel 150 may include an array substrate 110, an opposing substrate 140 and a liquid crystal layer 145 therebetween.

The array substrate 110 may include a plurality of gate lines GL, a plurality of data lines DL, a plurality of switching elements TR and a plurality of pixel electrodes PE. The data lines DL may extend in a first direction D1. The data lines DL may be arranged in a second direction D2 substantially perpendicular to the first direction D1. The gate lines GL may extend in the second direction D2. The gate lines GL may be arranged in the first direction D1. A switching element among the plurality of switching elements TR may be electrically connected to a gate line and a data line among the gate lines GL and the data lines DL. A pixel electrode among the plurality of pixel electrodes PE may be electrically connected to the switching element. A pixel area may be divided into two domains. In an exemplary embodiment, a pixel area may be defined by the pixel electrode, but the invention is not limited thereto. The domains in the pixel area will be further described in detail referring to FIGS. 2 and 3.

The opposing substrate 140 may face the array substrate 110. The liquid crystal layer 145 may be disposed between the array substrate 110 and the opposing substrate 140. The opposing substrate 140 may include a common electrode CE configured to generate a vertical electric field with the pixel electrodes PE. The opposing substrate 140 may further include a light blocking pattern BM overlapping the data line DL. The opposing substrate 140 may further include a color filter pattern corresponding to the pixel area.

Referring back to FIG. 1, the image driving part 160 may be configured to apply an electrical signal to the LCD panel 150. The image driving part 160 may include a gate driving part 161 and a data driving part 163. The gate driving part 161 may be configured to apply gate on/off signals to the gate lines GL. The gate driving part 161 may be mounted on the LCD panel 150 as a tape carrier package ("TCP") as shown in FIG. 1. In other exemplary embodiments, the gate driving part 161 may be mounted on the array substrate 110. The data driving part 163 may be configured to apply data signals to the data lines DL.

The first polarizer 170 may be disposed between the LCD panel 150 and the backlight unit 200. The first polarizer 170 may be configured to polarize light from the backlight unit 200 by a first polarizing axis.

The second polarizer 180 may be disposed between the LCD panel 150 and the light diffusion film 190. The second polarizer 180 may be configured to polarize light from the LCD panel 150 by a second polarizing axis.

The light diffusion film 190 may include at least two materials having refractive indices different from each other. In an exemplary embodiment, the light diffusion film 190 may include a body member and a low-refractive line member, for example. The body member may have a relatively high refractive index. The low-refractive line member may have a refractive index less than that of the body member. The light diffusion member 190 will be further described in detail referring to FIG. 4.

Figure 2:
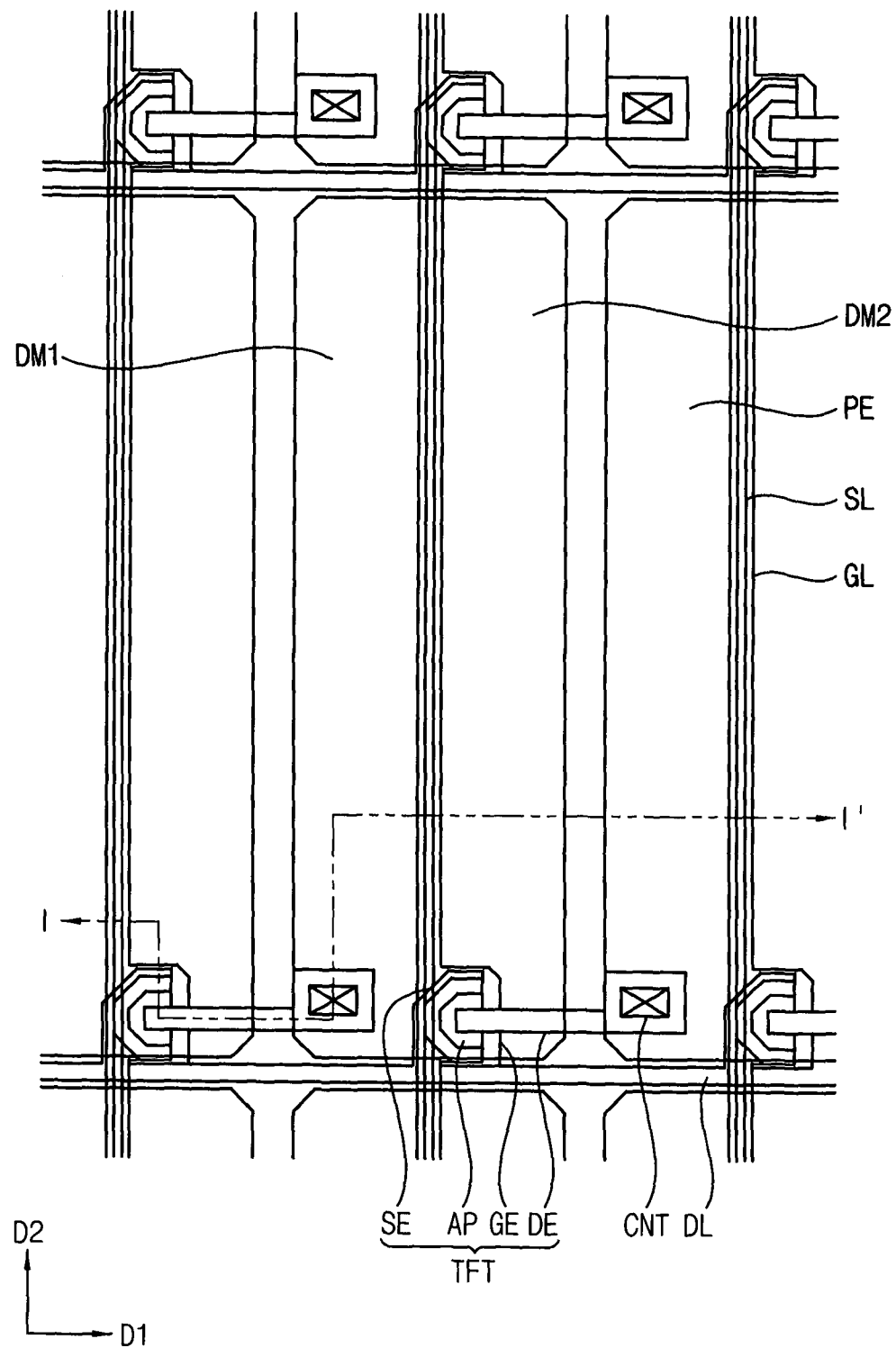
FIG. 2 is a plan view illustrating a display panel assembly in FIG. 1.
Figure 3:
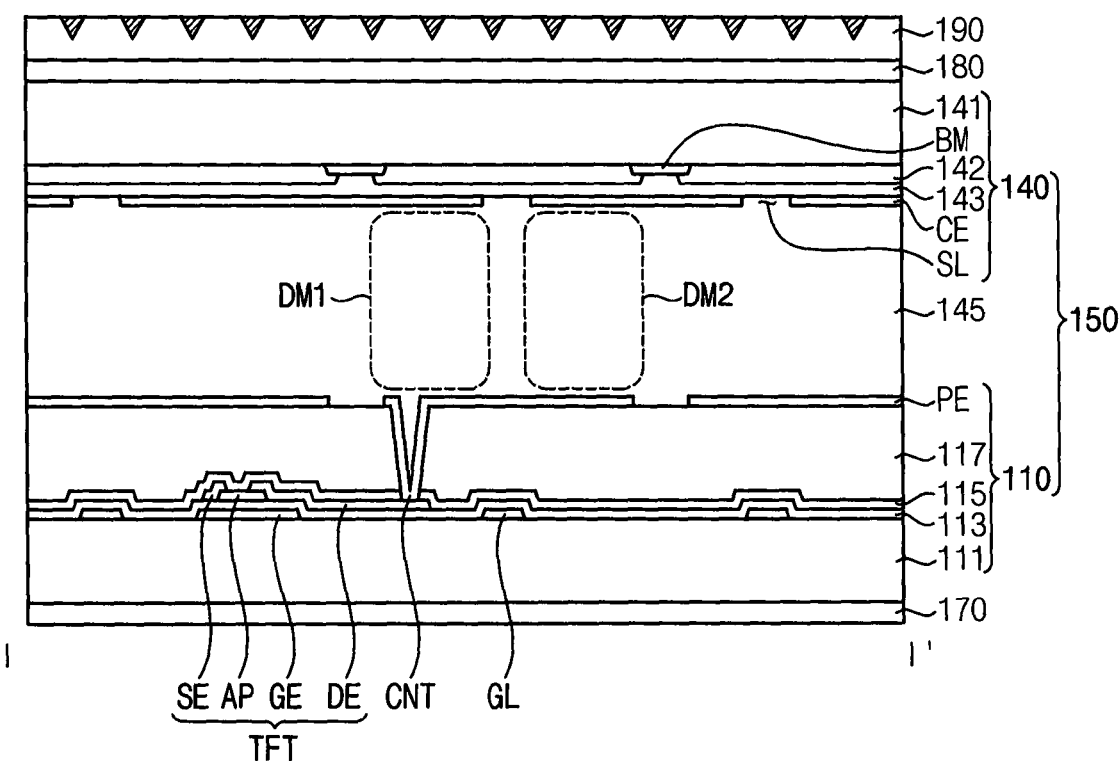
FIG. 3 is a cross-sectional view taken along line I-I' in FIG. 2.

FIG. 2 is a plan view illustrating a display panel assembly in FIG. 1. FIG. 3 is a cross-sectional view taken along line I-I' in FIG. 2.

Referring to FIGS. 2 and 3, the array substrate 110 of the LCD panel 150 in the exemplary embodiment may include a first base substrate 111, a gate line GL, a switching element TFT, a gate insulation layer 113, a data line DL, a passivation layer 115, an organic insulation layer 117 and a pixel electrode PE. The switching element TFT may include a gate electrode GE, an active pattern AP, a source electrode SE and a drain electrode DE.

The first base substrate 111 may include a transparent insulation material. In an exemplary embodiment, the first base substrate may include a glass, quartz, a plastic, a polyethylene terephthalate resin, a polyethylene resin, a polycarbonate resin, etc.

In an exemplary embodiment, the gate line GL may extend in the second direction D2 on the first base substrate 111, and may be arranged in the first direction D1 crossing the second direction D2. In an exemplary embodiment, the second direction D2 may be substantially perpendicular to the first direction D1. In an exemplary embodiment, the gate line GL may include, e.g., aluminum (Al), gold (Au), silver (Ag), copper (Cu), iron (Fe), nickel (Ni), etc. The above elements may be used alone or in a combination. In an exemplary embodiment, the gate line GL may include indium doped zinc oxide ("IZO"), gallium doped zinc oxide ("GZO"), etc.

The gate electrode GE may be electrically connected to the gate line GL. The gate electrode GE may include, e.g., a same material as that of the gate line GL. In an exemplary embodiment, the gate electrode GE may be unitary with the gate line GL.

The gate insulation layer 113 may be disposed on the first base substrate 111 on which the gate line GL and the gate electrode GE are disposed. In an exemplary embodiment, the gate insulation layer 113 may include a transparent insulation material, e.g., silicon oxide, silicon nitride, etc.

The active pattern AP may be disposed on the gate insulation layer 113. The active pattern AP may overlap the gate electrode GE. In an exemplary embodiment, the active pattern AP may include, e.g., indium (In), zinc (Zn), gallium (Ga), tin (Sn), hafnium (Hf), etc. In an exemplary embodiment, the active pattern AP may include an oxide semiconductor pattern. In an exemplary embodiment, the oxide semiconductor pattern may include indium gallium zinc oxide ("IGZO"), hafnium indium zinc oxide ("HIZO"), etc.

The data line DL may be disposed on the first base substrate 111 on which the active pattern AP is disposed. In an exemplary embodiment, the data line DL may extend in the first direction D1, and may be arranged in the second direction D2. The data line DL may include, e.g., a same material as that of the gate line GL. In an exemplary embodiment, the data line DL may include aluminum (Al), gold (Au), silver (Ag), copper (Cu), iron (Fe), nickel (Ni), etc.

The source electrode SE may be disposed on the gate insulation layer 113. The source electrode SE may overlap a first end portion of the active pattern AP. The source electrode SE may be electrically connected to the data line DL. In an exemplary embodiment, the source electrode SE may be unitary with the data line DL.

The drain electrode DE may be disposed on the gate insulation layer 113. The drain electrode DE may overlap a second end portion of the active pattern AP. The drain electrode DE may be spaced apart from the source electrode SE. The drain electrode DE may include, e.g., a same material as that of the source electrode SE. In an exemplary embodiment, the source electrode SE and the drain electrode DE may include aluminum (Al), gold (Au), silver (Ag), copper (Cu), iron (Fe), nickel (Ni), etc.

The passivation layer 115 may be disposed on the source electrode SE and the drain electrode DE. The passivation layer 115 may cover the source electrode SE and the drain electrode DE. In an exemplary embodiment, the passivation layer 115 may include an inorganic insulation material. In an exemplary embodiment, the passivation layer 115 may include silicon oxide, silicon nitride, etc.

The organic insulation layer 117 may be disposed on the passivation layer 115. The organic insulation layer 117 may cover the passivation layer 115. The organic insulation layer 117 may have a substantially flat surface. In an exemplary embodiment, the organic insulation layer 117 may include, e.g., an acryl resin, a phenol resin, etc.

The pixel electrode PE may be disposed on the organic insulation layer 117. The pixel electrode PE may contact the drain electrode DE through a contact hole CNT defined in the organic insulation layer 117 and the passivation layer 115. The pixel electrode PE may include a transparent conductive material. A second width of the pixel electrode PE along the second direction D2 in a plan view may be greater than a first width of the pixel electrode PE along the first direction D1.

The pixel electrode PE may overlap a portion of the gate line GL. In an exemplary embodiment, a central portion of the pixel electrode PE may overlap the gate line GL in a plan view. In an exemplary embodiment, a pixel area corresponding to the pixel electrode PE may be divided into a first domain DM1 and a second domain DM2. The first domain DM1 may be disposed at a first side of the gate line GL. The second domain DM2 may be disposed at a second side of the gate line GL opposite to the first side of the gate line GL.

Referring to FIGS. 2 and 3, the opposing substrate 140 of the LCD panel 150 in the exemplary embodiment may include a second base substrate 141, a light blocking pattern BM, a color filter pattern 142, an overcoating layer 143 and a common electrode CE.

The second base substrate 141 may include a transparent insulation material. In an exemplary embodiment, the second base substrate 141 may include a same material as that of the first base substrate 111.

The light blocking pattern BM may be disposed on the second base substrate 141. The light blocking pattern BM may overlap a boundary portion of the pixel electrode PE in a plan view. In an exemplary embodiment, the light blocking pattern BM may include, e.g., an organic or inorganic material configured to absorb light. In an exemplary embodiment, the light blocking pattern BM may include carbon black ("CB"), titan black ("TiBK"), chromium (Cr), chromium oxide, chromium nitride, etc.

The color filter pattern 142 may be disposed on the second base substrate 141 on which the light blocking pattern BM is disposed. The color filter pattern 142 may overlap a whole portion of the pixel electrode PE in a plan view. In an exemplary embodiment, the color filter pattern 142 may include, e.g., an organic material having a color such as red, green, blue, etc.

The overcoating layer 143 may be disposed on the second base substrate 141 on which the color filter pattern 142 is disposed. The overcoating layer 143 may include a transparent insulation material. The overcoating layer 143 may have a substantially flat surface.

The common electrode CE may include a transparent conductive material. In an exemplary embodiment, the common electrode CE may include a same material as the pixel electrode PE. The common electrode CE may have a plate shape defining a plurality of slits SL therein. The slits SL may extend in the second direction D2. The slits SL may overlap a portion of the gate line GL.

As mentioned above, the LCD panel 150 in the exemplary embodiment may have a patterned vertical alignment ("PVA") structure in which the pixel area is divided into two domains (i.e., DM1 and DM2) by an electrical field generated by the pixel electrode PE and the common electrode CE.

Figure 4:
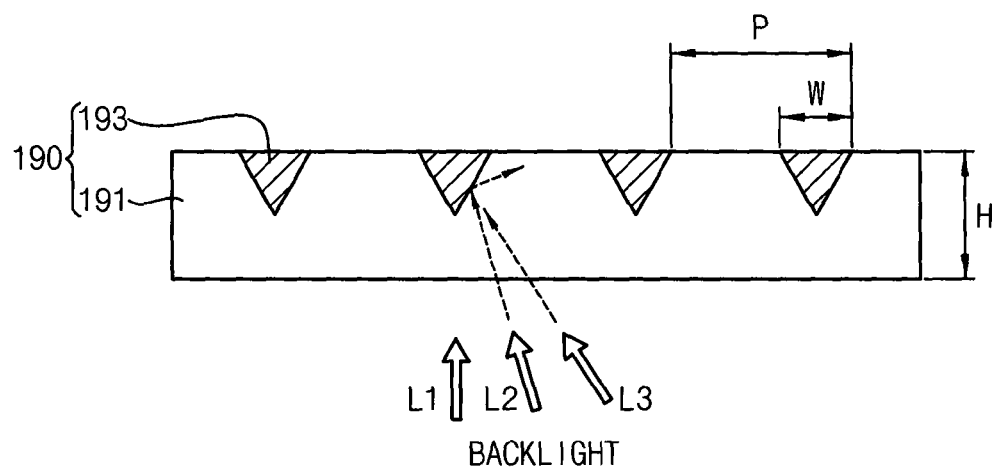
FIG. 4 is a cross-sectional view illustrating a light diffusion film in FIG. 3.

FIG. 4 is a cross-sectional view illustrating a light diffusion film in FIG. 3.

Referring to FIG. 4, the light diffusion film 190 may include a body member 191 and a plurality of low-refractive line members 193. The low-refractive line members 193 may be integrally disposed in the body member 191. In an exemplary embodiment, the body member 191 may include, e.g., an acryl resin, a polyester resin, a silicon resin, a urethane resin, etc. The body member 191 may have a refractive index greater than that of the low-refractive line members 193.

The body member 191 may have a notch-shaped line patterns defined therein. The low-refractive line members 193 may be disposed in the notch-shaped line patterns. In an exemplary embodiment, a cross-section of one of the low-refractive line members 193 may be V-shaped, for example. The low-refractive line members 193 may extend in the second direction D2 in which the gate line GL extends. The low-refractive line members 193 may be arranged in the first direction D1.

A thickness H of the light diffusion film 190 may be, e.g., equal to or less than about 400 micrometers (μm). In an exemplary embodiment, the thickness H of the light diffusion film 190 may be about 300 μm, for example. A width W of one of the low-refractive line members 193 may be, e.g., equal to or greater than about 25 μm and equal to or less than about 40 μm. In an exemplary embodiment, the width W of the one of the low-refractive line members 193 may be about 30 μm, for example. The width may be defined as a maximum dimension of the low-refractive line member 193 in the first direction D1. A gap between adjacent two low-refractive line members 193 may be, e.g., substantially equal to the width W of the low-refractive line members 193.

In an exemplary embodiment, a pitch P defined by a sum of the width W of the one of the low-refractive line members 193 and the gap between adjacent low-refractive line members 193 may be equal to or greater than about 50 μm and equal to or less than about 80 μm. In an exemplary embodiment, the pitch P of the low-refractive line members 193 may be about 60 μm, for example. However, the thickness H, the width W and the pitch P of the light diffusion film 190 are not limited thereto, and they may be determined differently as necessary.

The low-refractive line members 193 may be used as prisms in the light diffusion film 190. In an exemplary embodiment, a first light L1 perpendicularly entering the light diffusion film 190 from the LCD panel 150 may directly emit through the body member 191 and the low-refractive line members 193 of the light diffusion film 190. In an exemplary embodiment, a second light L2 entering the light diffusion film 190 from the LCD panel 150 as inclined by a first angle may be reflected at an interface of the body member 191 and the low-refractive line members 193 so that the second light L2 may emit laterally from the light diffusion film 190. In an exemplary embodiment, the second light L2 may emit toward a direction perpendicular to the first direction D1 in which the data line DL extends in a plan view. In an exemplary embodiment, a third light L3 entering the light diffusion film 190 from the LCD panel 150 may be absorbed in the low-refractive line members 193 passing through the interface between the body member 191 and the low-refractive line members 193.

In an exemplary embodiment, a surface of the light diffusion film 190 may be processed by anti-glaring so as to reduce a glaring due to the first light L1 and the second light L2.

Figure 5:
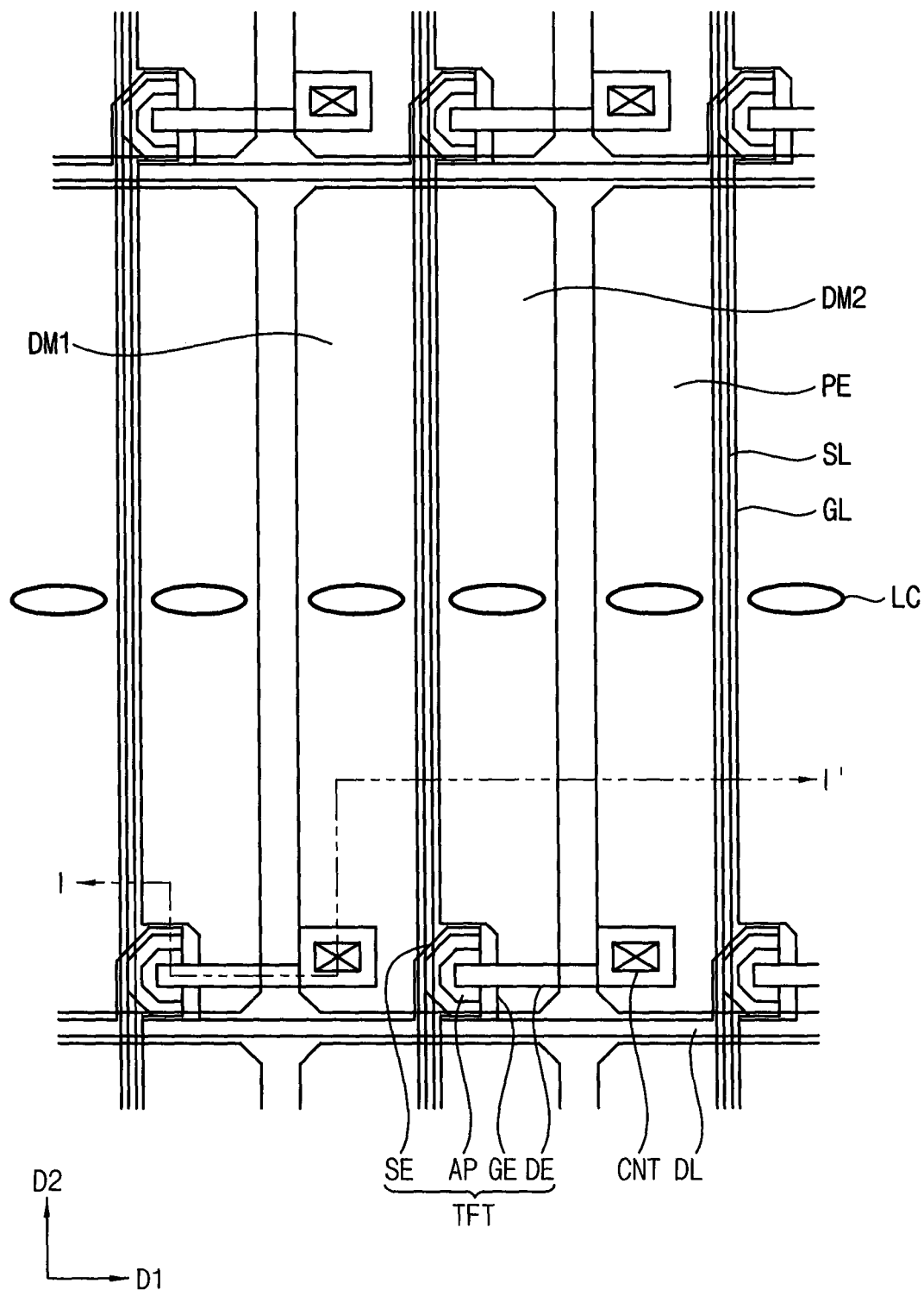
FIG. 5 is a plan view conceptually illustrating an alignment of liquid crystals of a display panel assembly in FIG. 2.
Figure 6:
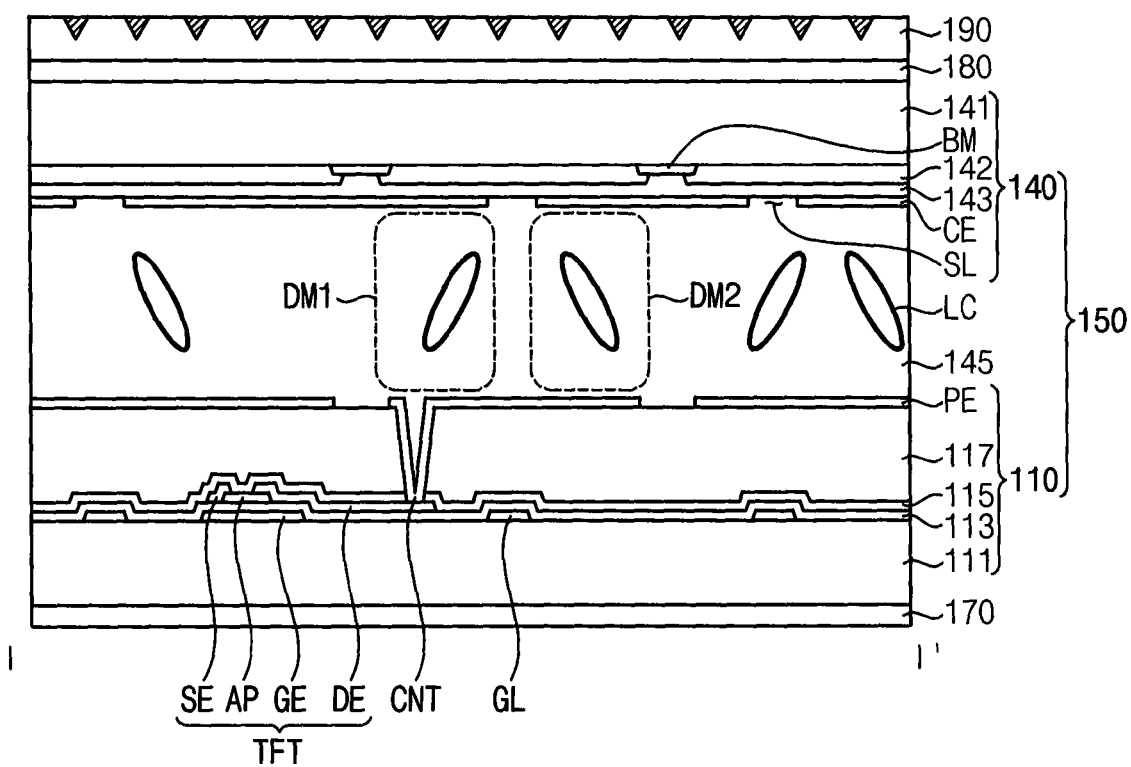
FIG. 6 is a cross-sectional view illustrating an alignment of the liquid crystals in FIG. 5.

FIG. 5 is a plan view conceptually illustrating an alignment of liquid crystals of a display panel assembly in FIG. 2. FIG. 6 is a cross-sectional view illustrating an alignment of the liquid crystals in FIG. 5.

Referring to FIGS. 5 and 6, in the LCD device according to the exemplary embodiment, liquid crystals LC in the liquid crystal layer 145 may be aligned in a desired direction by an electric field generated by the pixel electrode PE and the common electrode CE. In an exemplary embodiment, when a first data voltage is applied to the pixel electrode PE and a first common voltage is applied to the common electrode CE, the liquid crystals LC in the first domain DM1 may be aligned as inclined toward a positive direction along the first direction D1 in a cross-sectional view. The liquid crystals LC in the second domain DM2 may be aligned as inclined toward a negative direction along the first direction D1 in the cross-sectional view. As the liquid crystals LC are aligned to incline along the first direction D1 in the first domain DM1 and the second domain DM2, an amount of light emitting toward the second direction D2 may increase in the LCD panel 150, thereby improving a viewing angle of an image in the second direction D2.

A luminance of the light emitting toward the first direction D1 in the LCD panel 150 may be less than a luminance of the light emitting toward the second direction D2. However, reflection of the light may increase along the first direction D1 due to the low-refractive line members 193 of the light diffusion film 190 on the LCD panel 150, thereby increasing an amount of light emitting toward the first direction D1. Accordingly, a viewing angle of the image in the first direction D1 may also be improved.

As mentioned above, an LCD panel may have a PVA structure in which a pixel area is divided into two domains and a light diffusion film on the LCD panel may include a plurality of low-refractive line members substantially perpendicular to an alignment direction of liquid crystals LC in the LCD panel in a plan view, thereby improving a viewing angle of an image in all directions including a longitudinal direction and a transverse direction.

Figure 7:
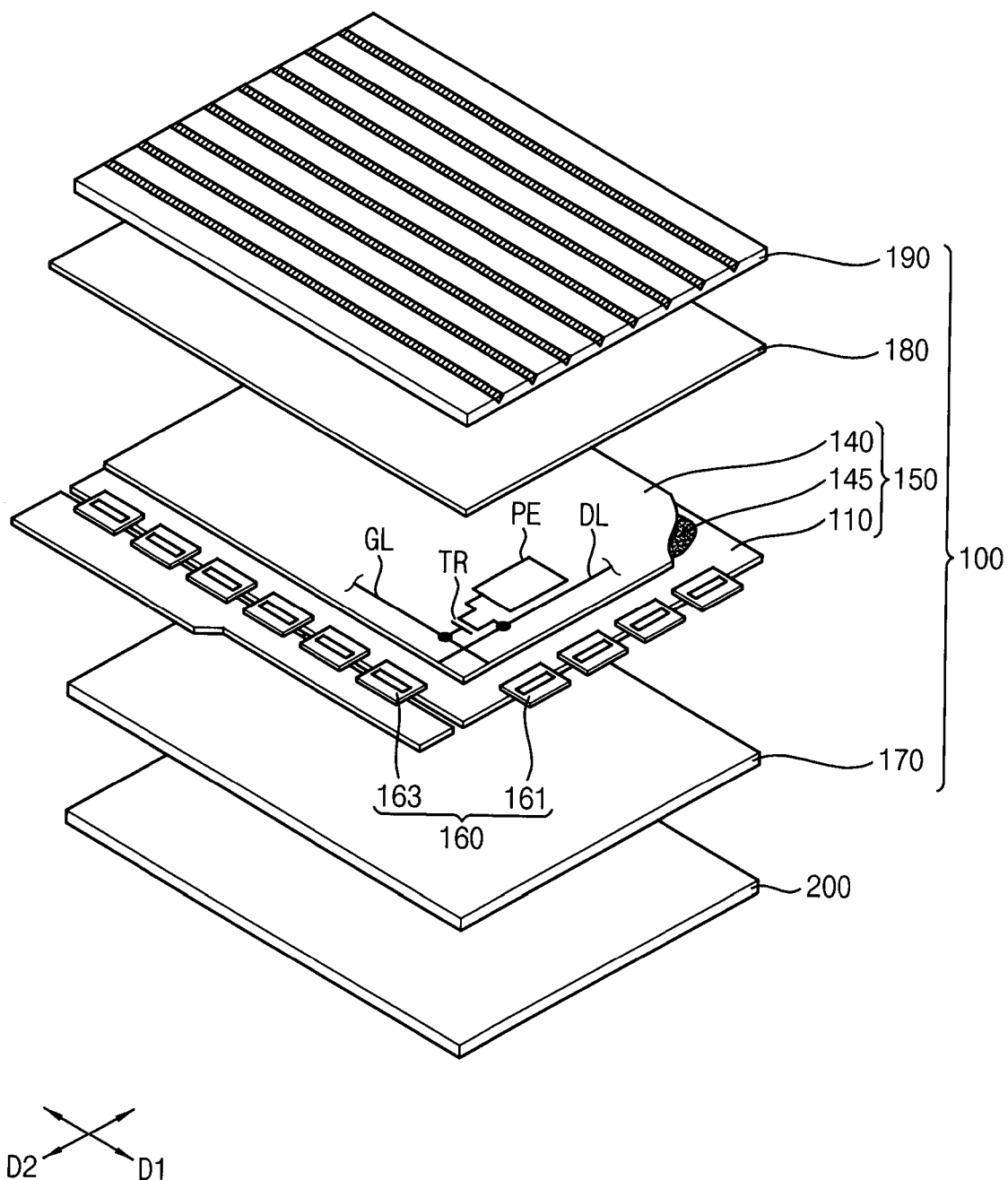
FIG. 7 is an exploded perspective view illustrating an LCD device according to an exemplary embodiment of the invention.

FIG. 7 is an exploded perspective view illustrating an LCD device according to an exemplary embodiment of the invention.

Referring to FIG. 7, an LCD device according to the exemplary embodiment may be substantially the same as the LCD device illustrated in FIG. 1 except that a gate line GL, a data line DL, a switching element TR, a pixel electrode PE and a low-refractive line members in a light diffusion film 190. Hereinafter, the identical elements will be omitted or briefly described.

The LCD device according to the exemplary embodiment may include a display panel assembly 100 and a backlight unit 200.

The display panel assembly 100 may include an LCD panel 150, a light diffusion film 190 and an image driving part 160 configured to drive the LCD panel 150. The display panel assembly 100 may further include a first polarizer 170 under the LCD panel 150 and a second polarizer 180 on the LCD panel 150. The light diffusion film 190 may be disposed on the second polarizer 180.

The LCD panel 150 may include an array substrate 110, an opposing substrate 140 and a liquid crystal layer 145 therebetween.

The array substrate 110 may include a plurality of gate lines GL, a plurality of data lines DL, a plurality of switching elements TR and a plurality of pixel electrodes PE. The gate lines GL may extend in a first direction D1. The gate lines GL may be arranged in a second direction D2 substantially perpendicular to the first direction D1. The data lines DL may extend in the second direction D2. The data lines DL may be arranged in the first direction D1. A switching element among the plurality of switching elements TR may be electrically connected to a gate line and a data line among the gate lines GL and the data lines DL. A pixel electrode among the plurality of pixel electrodes PE may be electrically connected to the switching element. In an exemplary embodiment, a pixel area corresponding to the pixel electrode may be divided into two domains.

The opposing substrate 140 may face the array substrate 110. The liquid crystal layer 145 may be disposed between the array substrate 110 and the opposing substrate 140. The opposing substrate 140 may include a common electrode CE configured to generate a vertical electric field with the pixel electrodes PE. The opposing substrate 140 may further include a light blocking pattern BM overlapping the data line DL. The opposing substrate 140 may further include a color filter pattern corresponding to the pixel area.

In the exemplary embodiment, a width of the LCD panel 150 along the first direction D1 may be greater than a width of the LCD panel 150 along the second direction D2.

The image driving part 160 may include a gate driving part 163 and a data driving part 161.

The first polarizer 170 may be disposed between the LCD panel 150 and the backlight unit 200.

The second polarizer 180 may be disposed between the LCD panel 150 and the light diffusion film 190.

The light diffusion film 190 may include a body member and a low-refractive line member. The body member may have a refractive index greater than that of the low-refractive line member. The body member may have a notch-shaped line patterns. The low-refractive line member may be disposed in the notch-shaped line patterns. In an exemplary embodiment, a cross-section of the low-refractive line member may be V-shaped. The low-refractive line member may extend in the first direction D1 in which the gate line GL extends. The low-refractive line member may be arranged in the second direction D2. The low-refractive line member may be used as a prism in the light diffusion film 190.

Figure 8:
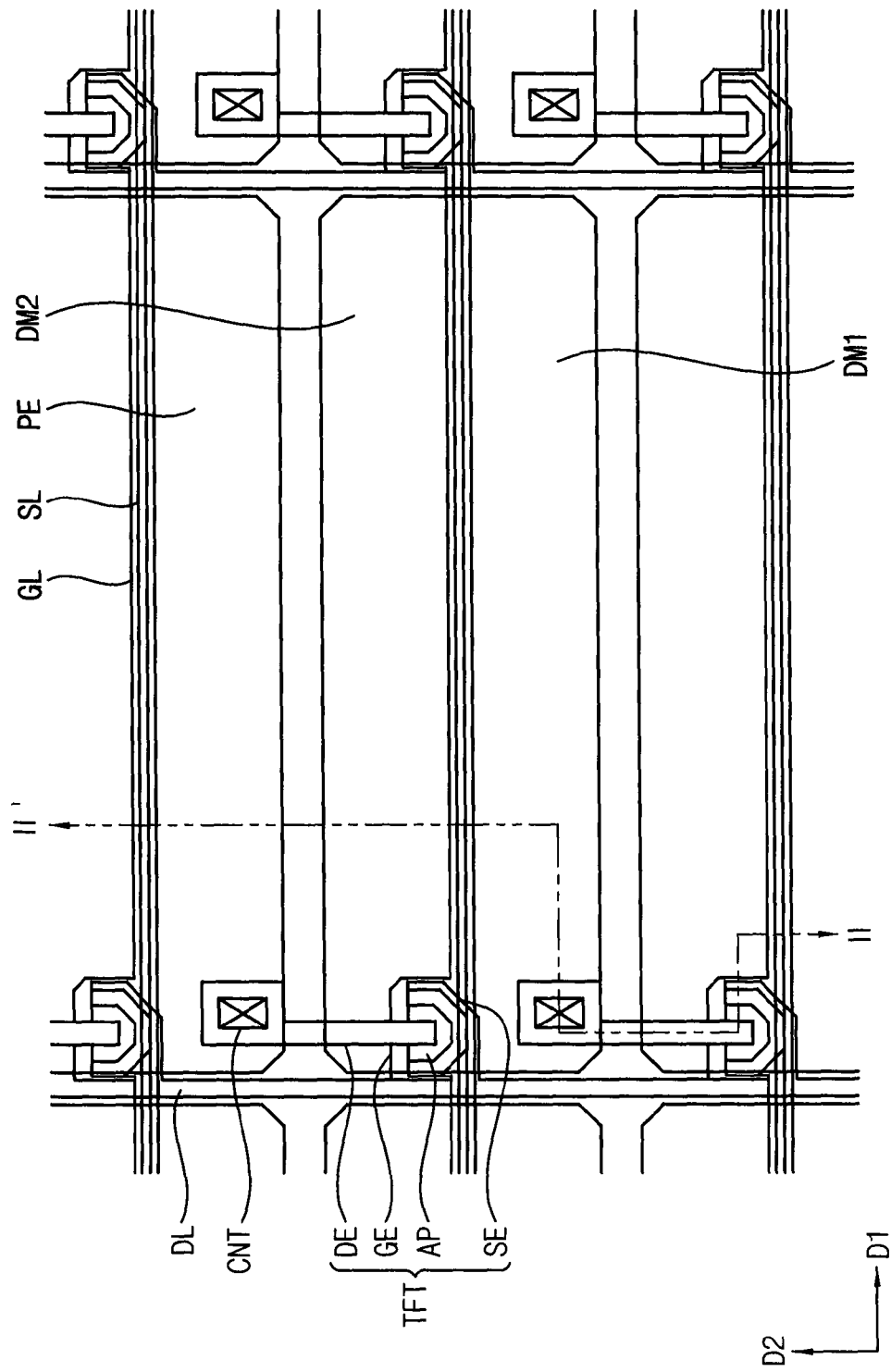
FIG. 8 is a plan view illustrating a display panel assembly in FIG. 7.
Figure 9:
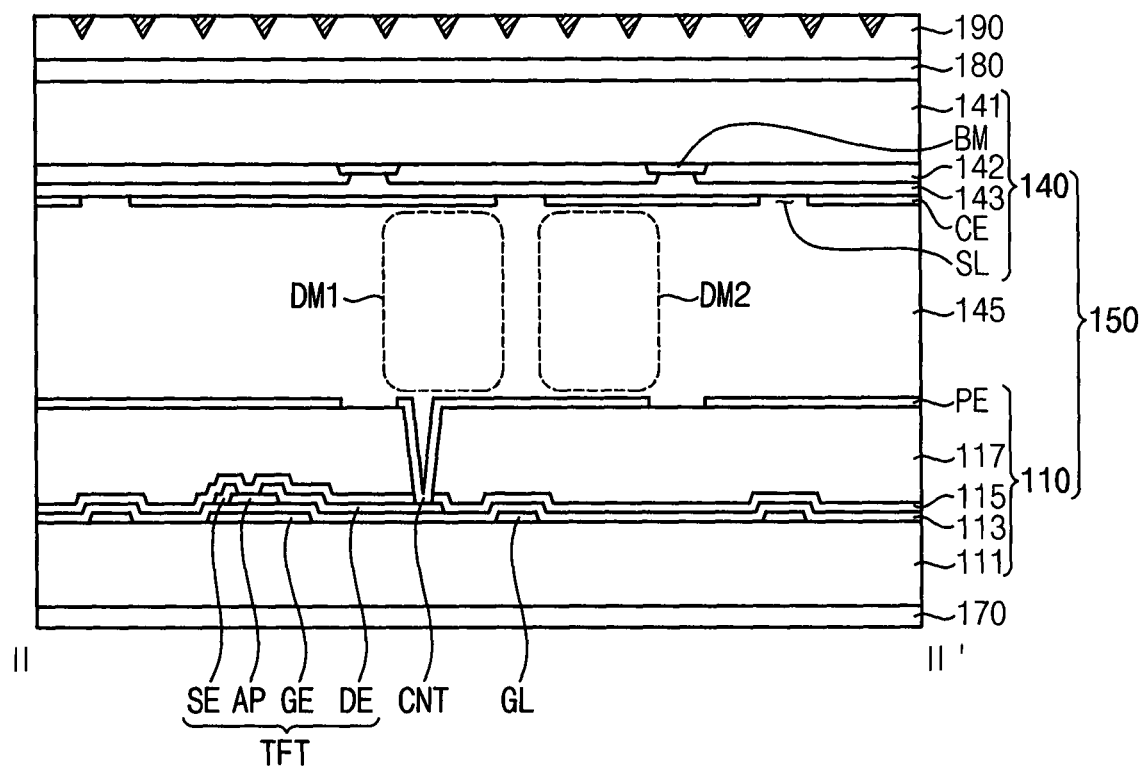
FIG. 9 is a cross-sectional view taken along line II-IF in FIG. 8.

FIG. 8 is a plan view illustrating a display panel assembly in FIG. 7. FIG. 9 is a cross-sectional view taken along line II-II' in FIG. 8.

Referring to FIGS. 8 and 9, the array substrate 110 of the LCD panel 150 in the exemplary embodiment may include a first base substrate 111, a gate line GL, a switching element TFT, a gate insulation layer 113, a data line DL, a passivation layer 115, an organic insulation layer 117 and a pixel electrode PE. The switching element TFT may include a gate electrode GE, an active pattern AP, a source electrode SE and a drain electrode DE.

The first base substrate 111 may include a transparent insulation material.

In an exemplary embodiment, the gate line GL may extend in the first direction D1 on the first base substrate 111, and may be arranged in the second direction D2 crossing the first direction D1.

The gate electrode GE may be electrically connected to the gate line GL. In an exemplary embodiment, the gate electrode GE may be unitary with the gate line GL.

The gate insulation layer 113 may be disposed on the first base substrate 111 on which the gate line GL and the gate electrode GE are disposed.

The active pattern AP may be disposed on the gate insulation layer 113. The active pattern AP may overlap the gate electrode GE.

The data line DL may be disposed on the first base substrate 111 on which the active pattern AP is disposed. The data line DL may extend in the second direction D2, and may be arranged in the first direction D1.

The source electrode SE may be disposed on the gate insulation layer 113. The source electrode SE may overlap a first end portion of the active pattern AP. The source electrode SE may be, for example, unitary with the data line DL.

The drain electrode DE may be disposed on the gate insulation layer 113. The drain electrode DE may overlap a second end portion of the active pattern AP. The drain electrode DE may be spaced apart from the source electrode SE.

The passivation layer 115 may be disposed on the source electrode SE and the drain electrode DE. The passivation layer 115 may cover the source electrode SE and the drain electrode DE.

The organic insulation layer 117 may be disposed on the passivation layer 115. The organic insulation layer 117 may cover the passivation layer 115.

The pixel electrode PE may be disposed on the organic insulation layer 117. The pixel electrode PE may contact the drain electrode DE through a contact hole CNT defined in the organic insulation layer 117 and the passivation layer 115. The pixel electrode PE may include a transparent conductive material. A first width of the pixel electrode PE along the first direction D1 in a plan view may be greater than a second width of the pixel electrode PE along the second direction D2.

The pixel electrode PE may overlap a portion of the gate line GL. In an exemplary embodiment, a central portion of the pixel electrode PE may overlap the gate line GL in a plan view. In an exemplary embodiment, a pixel area corresponding to the pixel electrode PE may be divided into a first domain DM1 and a second domain DM2. The first domain DM1 may be disposed at a first side of the gate line GL. The second domain DM2 may be disposed at a second side of the gate line GL opposite to the first side of the gate line GL.

Referring back to FIGS. 8 and 9, the opposing substrate 140 of the LCD panel 150 in the exemplary embodiment may include a second base substrate 141, a light blocking pattern BM, a color filter pattern 142, an overcoating layer 143 and a common electrode CE.

The second base substrate 141 may include a transparent insulation material.

The light blocking pattern BM may be disposed on the second base substrate 141. The light blocking pattern BM may overlap a boundary portion of the pixel electrode PE in a plan view.

The color filter pattern 142 may be disposed on the second base substrate 141 on which the light blocking pattern BM is disposed. The color filter pattern 142 may overlap a whole portion of the pixel electrode PE in a plan view.

The overcoating layer 143 may be disposed on the second base substrate 141 on which the color filter pattern 142 is disposed.

The common electrode CE may have a plate shape defining a plurality of slits SL therein. The slits SL may extend in the second direction D2. The slits SL may overlap a portion of the gate line GL.

As mentioned above, the LCD panel 150 in the exemplary embodiment may have a PVA structure in which the pixel area is divided into two domains (i.e., DM1 and DM2) by an electrical field generated by the pixel electrode PE and the common electrode CE.

Figure 10:
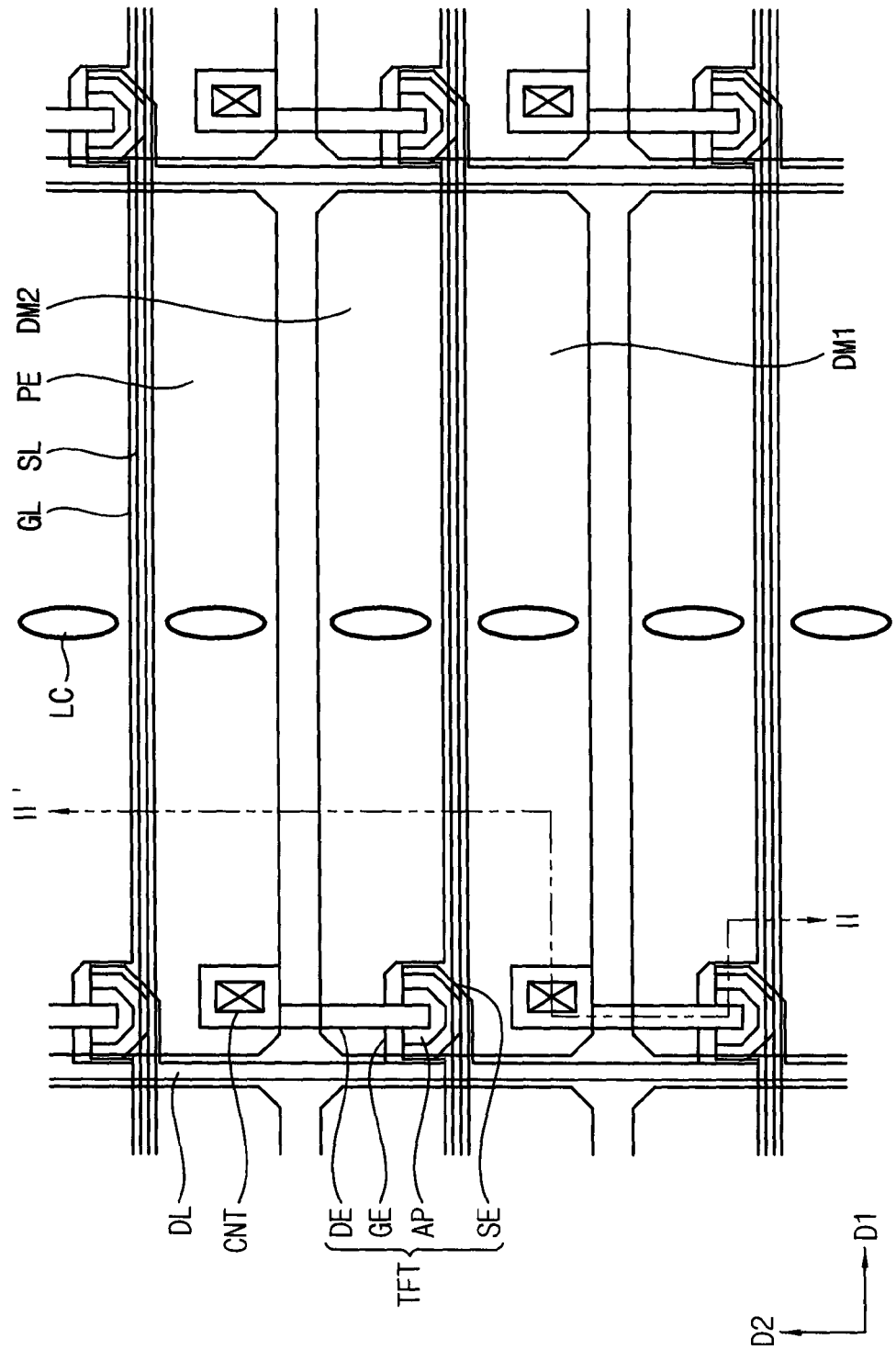
FIG. 10 is a plan view conceptually illustrating an alignment of liquid crystals of a display panel assembly in FIG. 7.

FIG. 10 is a plan view conceptually illustrating an alignment of liquid crystals of a display panel assembly in FIG. 7.

Referring to FIGS. 7, 9 and 10, in the LCD device according to the exemplary embodiment, liquid crystals LC in the liquid crystal layer 145 may be aligned in a desired direction by an electric field generated by the pixel electrode PE and the common electrode CE. In an exemplary embodiment, when a second data voltage is applied to the pixel electrode PE and a second common voltage is applied to the common electrode CE, the liquid crystals LC in the first domain DM1 may be aligned as inclined toward a positive direction along the second direction D1. The liquid crystals LC in the second domain DM2 may be aligned as inclined toward a negative direction along the second direction D2. As the liquid crystals LC are aligned to incline along the second direction D2 in the first domain DM1 and the second domain DM2, an amount of light emitting toward the first direction D1 may increase in the LCD panel 150, thereby improving a viewing angle of an image in the first direction D1.

A luminance of the light emitting toward the second direction D2 in the LCD panel 150 may be less than a luminance of the light emitting toward the first direction D1. However, reflection of the light may increase along the second direction D2 due to the low-refractive line members 193 of the light diffusion film 190 on the LCD panel 150, thereby increasing an amount of light emitting toward the second direction D2. Accordingly, a viewing angle of the image in the second direction D2 may also be improved.

As mentioned above, according to one or more exemplary embodiment of the LCD device, an LCD panel may have a PVA structure in which a pixel area is divided into two domains and a light diffusion film on the LCD panel may include a plurality of low-refractive line members substantially perpendicular to an alignment direction of liquid crystals LC in the LCD panel in a plan view, thereby improving a viewing angle of an image in all directions including a longitudinal direction and a transverse direction.

The foregoing is illustrative of exemplary embodiments and is not to be construed as limiting thereof. Although a few exemplary embodiments have been described, those skilled in the art will readily appreciate that many modifications are possible in exemplary embodiments without materially departing from the novel teachings and advantages of the invention. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A liquid crystal display device comprising:
   a liquid crystal display panel comprising:
   an array substrate comprising:
   a pixel electrode;
   a gate line extending in a first direction and crossing the pixel electrode; and
   a data line extending in a second direction substantially perpendicular to the first direction;
   an opposing substrate comprising a common electrode in which a slit extending in the first direction, overlapping the gate line, and having a length longer than a length of the pixel electrode along the first direction of the gate line in a plan view is defined; and
   a liquid crystal layer between the array substrate and the opposing substrate; and
   a light diffusion film which is disposed on the liquid crystal display panel and comprises a plurality of low-refractive line members which respectively extends in the first direction and is arranged in the second direction,
   wherein an entire width of the slit is less than an entire width of the gate line in the second direction.

2. The liquid crystal display device of claim 1, wherein the light diffusion film further comprises a body member having a refractive index greater than that of the plurality of low-refractive line members.

3. The liquid crystal display device of claim 2, wherein a cross-section of one of the plurality of low-refractive line members cut along the second direction has a substantially V-shape.

4. The liquid crystal display device of claim 2, wherein a width of one of the plurality of low-refractive line members is substantially equal to a gap between adjacent low-refractive line members of the plurality of low-refractive line members.

5. The liquid crystal display device of claim 4, wherein a pitch of the plurality of low-refractive line members is equal to or greater than about 50 micrometers and equal to or less than about 80 micrometers.

6. The liquid crystal display device of claim 1, wherein a thickness of the light diffusion film is equal to or less than about 400 micrometers.

7. The liquid crystal display device of claim 1, wherein the gate line crosses a central portion of the pixel electrode.

8. The liquid crystal display device of claim 1, wherein a first width of the pixel electrode along the first direction is greater than a second width of the pixel electrode along the second direction.

9. The liquid crystal display device of claim 1, wherein the opposing substrate further comprises a color filter pattern overlapping the pixel electrode.

10. The liquid crystal display device of claim 1, wherein the opposing substrate further comprises a light blocking pattern overlapping a boundary portion of the pixel electrode.

11. The liquid crystal display device of claim 1, further comprising:
    a first polarizer disposed under the array substrate; and
    a second polarizer between the opposing substrate and the light diffusion film.

12. The liquid crystal display device of claim 1, wherein a pixel area corresponding to the pixel electrode is divided into a first domain and a second domain by the gate line, and
    wherein liquid crystals in the liquid crystal layer are configured to align along a same direction in the first domain and the second domain in the plan view.

13. The liquid crystal display device of claim 12, wherein the liquid crystals in the liquid crystal layer are configured to incline with respect to a thickness direction of the liquid crystal layer in the first domain and the second domain.

14. The liquid crystal display device of claim 1, wherein the array substrate further comprises a switching element electrically connected to the gate line, the data line and the pixel electrode.

15. A liquid crystal display device comprising:
    a backlight unit configured to generate light;
    a liquid crystal display panel which is configured to control the light and comprises:
    an array substrate comprising:
    a pixel electrode;
    a gate line extending in a first direction and crossing the pixel electrode; and
    a data line extending in a second direction substantially perpendicular to the first direction;
    an opposing substrate comprising a common electrode in which a slit extending in the first direction, overlapping the gate line, and having a length longer than a length of the pixel electrode along the first direction of the gate line in a plan view is defined; and
    a liquid crystal layer between the array substrate and the opposing substrate; and
    a light diffusion film which is disposed on the liquid crystal display panel and comprises a plurality of low-refractive line members which respectively extends in the first direction and is arranged in the second direction,
    wherein an entire width of the slit is less than an entire width of the gate line in the second direction.

16. The liquid crystal display device of claim 15, wherein the light diffusion film further comprises a body member having a refractive index greater than that of the plurality of low-refractive line members.

17. The liquid crystal display device of claim 16, wherein a cross-section of one of the plurality of low-refractive line members cut along the second direction has a substantially V-shape.

18. The liquid crystal display device of claim 15, wherein the gate line crosses a central portion of the pixel electrode.

19. The liquid crystal display device of claim 15, wherein a first width of the pixel electrode along the first direction is greater than a second width of the pixel electrode along the second direction.

20. The liquid crystal display device of claim 19, wherein a third width of the liquid crystal display panel along the first direction is greater than a fourth width of the liquid crystal display panel along the second direction.

* * * * *